US012769389B2

(12) United States Patent
Liu et al.

(10) Patent No.: US 12,769,389 B2
(45) Date of Patent: Oct. 20, 2026

(54) HUMAN-COMPUTER INTERACTION METHOD AND APPARATUS FOR XR SYSTEM, STORAGE MEDIUM, AND SYSTEM

(71) Applicant: Beijing Zitiao Network Technology Co., Ltd., Beijing (CN)

(72) Inventors: Jiawei Liu, Beijing (CN); Han Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 153 days.

(21) Appl. No.: 18/634,449

(22) Filed: Apr. 12, 2024

(65) Prior Publication Data

US 2024/0345654 A1 Oct. 17, 2024

(30) Foreign Application Priority Data

Apr. 17, 2023 (CN) ......................... 202310409279.8

(51) Int. Cl.
*G06F 3/04815* (2022.01)
*G06F 3/01* (2006.01)
*G06F 3/04845* (2022.01)

(52) U.S. Cl.
CPC .......... *G06F 3/011* (2013.01); *G06F 3/04815* (2013.01); *G06F 3/04845* (2013.01)

(58) Field of Classification Search
CPC ...... G06F 3/04883; G06F 3/011; G06F 3/017; G06F 3/04815; G06F 3/04845; G06F 3/013; G06F 3/0346; G06T 19/006
See application file for complete search history.

(56) References Cited

U.S. PATENT DOCUMENTS

2016/0179352 A1* 6/2016 Shiraishi ................. G06F 3/005 715/762
2022/0084279 A1* 3/2022 Lindmeier .......... G06F 3/04842
2023/0057421 A1 2/2023 Yang

FOREIGN PATENT DOCUMENTS

CN 112527112 A 3/2021
CN 113359995 A 9/2021

OTHER PUBLICATIONS

AR/MR product design (Part 2): How to interact naturally with virtual objects with your hands AR industry, reterived from the link: "https://zhuanlan.zhihu.com/p/517435036", Mar. 4, 2023, pp. 1-21.

(Continued)

*Primary Examiner* — Rinna Yi

(57) ABSTRACT

The present disclosure provides a human-computer interaction method and apparatus for an XR system, a storage medium, and a system, and the method includes: displaying a first picture including at least one object to be operated; acquiring a distance between a user's hands in response to a first trigger for operating the object to be operated; displaying a dynamic picture in which a layout of the at least one object to be operated changes correspondingly with the distance between the user's hands, when the user's hands perform an action; and in response to a second trigger for an operation result of the object to be operated, transitionally switching from a current dynamic picture to a corresponding target picture according to a distance change state of the user's hands during a process from the first trigger to the second trigger.

16 Claims, 5 Drawing Sheets

(56) References Cited

OTHER PUBLICATIONS

Office action received for Chinese patent application No. 202310409279.8 mailed on May 26, 2026, 18 pages (9 pages English Translation and 9 pages Original document).

* cited by examiner

HUMAN-COMPUTER INTERACTION METHOD AND APPARATUS FOR XR SYSTEM, STORAGE MEDIUM, AND SYSTEM

CROSS-REFERENCE TO RELATED APPLICATION

The present application claims the priority to Chinese Patent Application No. 202310409279.8, filed on Apr. 17, 2023, the entire disclosure of which is incorporated herein by reference as portion of the present application.

TECHNICAL FIELD

The present disclosure relates to the field of XR display technology, specifically, relates to a human-computer interaction method and apparatus for an XR system, a storage medium, and a system.

BACKGROUND

Extended Reality (XR) is an emerging concept that refers to an environment combining virtual and real elements generated through computer technology and wearable devices, where human-computer interaction is possible. XR includes several forms, such as Virtual Reality (VR), Augmented Reality (AR), and Mixed Reality (MR).

In current XR systems, human-computer interaction operations largely depend on UI button presses, which require moving a cursor to a specific region and then performing keystroke operations. This method of interaction may be inconvenient, and the functionality of interaction is dependent on UI. As a result, this may lead to UI information overload within the region or require complex operation paths.

SUMMARY

At least one embodiment of the present disclosure provides a human-computer interaction method for an XR system, which includes:

- displaying a first picture comprising at least one object to be operated;
- acquiring a distance between a user's hands in response to a first trigger for operating the object to be operated;
- displaying a dynamic picture in which a layout of the at least one object to be operated changes correspondingly with the distance between the user's hands, when the user's hands perform an action; and
- in response to a second trigger for an operation result of the object to be operated, transitionally switching from a current dynamic picture to a corresponding target picture according to a distance change state of the user's hands during a process from the first trigger to the second trigger.

At least one embodiment of the present disclosure further provides a human-computer interaction apparatus for an XR system, which includes:

- a first display module, configured to display a first picture comprising at least one object to be operated;
- a first triggering module, configured to acquire a distance between a user's hands in response to a first trigger for operating the object to be operated;
- a second display module, configured to display a dynamic picture in which a layout of the at least one object to be operated changes correspondingly with the distance between the user's hands, when the user's hands perform an action; and
- a second triggering module, configured to, in response to a second trigger for an operation result of the object to be operated, transitionally switch from a current dynamic picture to a corresponding target picture according to a distance change state of the user's hands during a process from the first trigger to the second trigger.

At least one embodiment of the present disclosure further provides a computer-readable storage medium on which a computer program is stored, the computer program, when executed by a processing apparatus, implements a human-computer interaction method for an XR system provided by any one of embodiment of the present disclosure.

At least one embodiment of the present disclosure further provides an XR system, which comprises:

- a storage apparatus on which a computer program is stored; and
- a processing apparatus, configured to execute the computer program stored in the storage apparatus, to implement a human-computer interaction method for an XR system provided by any one of embodiment of the present disclosure.

BRIEF DESCRIPTION OF DRAWINGS

The above and other features, advantages, and aspects of various embodiments of the present disclosure will become more apparent with reference to the following detailed description taken in conjunction with the drawings. Throughout the drawings, the same or similar reference numbers refer to the same or similar elements. It is to be understood that the drawings are schematic, and the components and elements are not necessarily drawn to scale. In the drawings.

DETAILED DESCRIPTION

Figure 1:
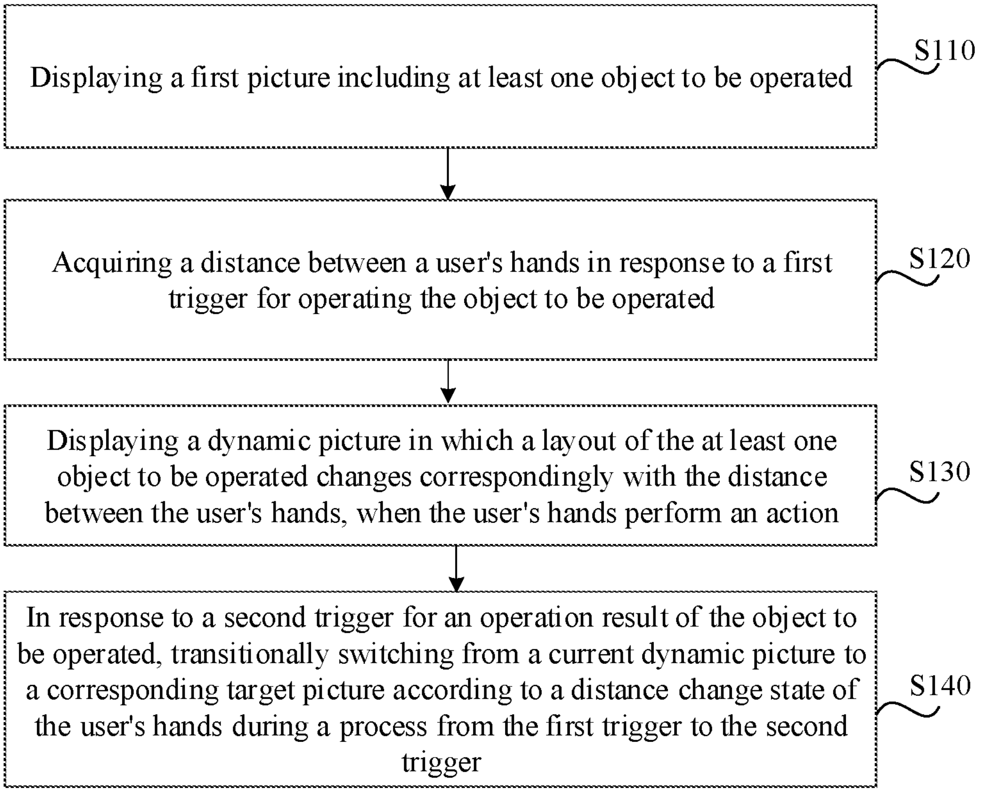
FIG. 1 illustrates a flowchart of a human-computer interaction method for an XR system in an exemplary embodiment.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of the messages or information exchanged between a plurality of apparatuses in the embodiments of the present disclosure are for illustrative purposes only and are not intended to limit the scope of these messages or information.

It may be understood that before using the technical solutions disclosed in the embodiments of the present disclosure, it is necessary to inform user(s) the types, using scope, and using scenarios of personal information involved in the present disclosure according to relevant laws and regulations in an appropriate manner and obtain the authorization of the user(s).

For example, in response to receiving a user's active request, a prompt message is sent to the user to clearly remind the user that the requested operation will require acquiring and using the user's personal information. Thus, users can selectively choose whether to provide personal information to the software or hardware such as an electronic device, an application, a server, or a storage medium that perform the operations of the technical solutions of the present disclosure according to the prompt message.

As an optional but non-restrictive implementation, in response to receiving the user's active request, sending the prompt message to the user may be done in the form of a pop-up window, where the prompt message may be presented in text. In addition, the pop-up window may further carry a selection control for users to choose between "agree" or "disagree" to provide the personal information to an electronic device.

It may be understood that the above-mentioned processes of informing and acquiring user authorization are only illustrative and do not limit the embodiments of the present disclosure. Other methods that comply with relevant laws and regulations may also be applied to the embodiments of the present disclosure.

Meanwhile, it may be understood that the data involved in the technical solutions (including but not limited to the data itself, data acquisition or use) should comply with the requirements of corresponding laws, regulations and relevant provisions.

At present, most of the human-computer interaction operations of an XR system are concentrated on single-handed clicking/dragging, with a small portion using gestures for operations. With the development of the XR system and the increase in functions, each button or gesture is basically occupied by each function. If there is a desire to incorporate new interaction operations, one would either have to use complex key combinations or place the interactive functions in a UI menu. However, complex key combinations may be operationally costly and non-intuitive, while placing interactive functions in a UI menu requires a longer operation path and cannot be triggered in real time. Therefore, the embodiments of the present disclosure provide a human-computer interaction method that satisfies rationality and ease of use and may become an important operating method for human-computer interaction in future XR systems.

FIG. 1 illustrates a flowchart of a human-computer interaction method for an XR system according to an exemplary embodiment; and referring to FIG. 1, the interaction method includes the following steps.

Step S110: displaying a first picture including at least one object to be operated.

First, the XR system displays a first picture, which includes one or more objects to be operated. The object to be operated may be a window interface, a desktop interface, a service interfaces for a widget, or the like.

Step S120: acquiring a distance between a user's hands in response to a first trigger for operating the object to be operated.

In the present disclosure, an operation handle or a gesture may be used to trigger operations on the object to be operated and to trigger the operation result.

In an implementation, when a target button on the operation handle connected to the XR system is pressed, it is determined that the first trigger for operating the object to be operated is received. Exemplarily, the target button may be a single button or a combination of multiple buttons. Exemplarily, a user may press one button on the operation handle with one hand, or press two or more buttons simultaneously with one hand, or press the same or different buttons on the left and right operation handles simultaneously with both hands, or press two or more buttons on the left and right operation handles simultaneously with both hands. When the user presses the target button on the operation handle, it indicates that the user wants to operate the objects to be operated on the first picture, such as to arrange the objects to be operated on the first picture regularly, or to move the objects to be operated from the first picture to display another target picture. When the target button is pressed, it is determined that the first trigger is received, and then the distance between the user's hands is acquired in response to the first trigger.

In an implementation, in the case where a target gesture made by the user is recognized, it is determined that the first trigger for operating the object to be operated is received. Exemplarily, the XR system can capture hand images of the user's hands using a capturing device and recognize gestures in the hand images. In the case where the target gesture made by the user is recognized, it is determined that the first trigger for operating the object to be operated is received, and the distance between the user's hands is acquired in response to the first trigger. Exemplarily, the target gesture may be, for example, pinching the thumb and index finger of the user's left hand/right hand/both hands, or making a fist with the user's left hand/right hand/both hands, etc. Specifically, the target gesture may be predefined.

It is worth noting that the distance between the user's hands may be obtained through image recognition of the hand images of the user's hands captured by the capturing device. Alternatively, the distance between the user's hands may be obtained by determining a handle distance between the left and right operation handles based on the posture of the operation handles, then taking the handle distance as the distance between the user's hands.

Step S130: displaying a dynamic picture in which a layout of the at least one object to be operated changes correspondingly with the distance between the user's hands, when the user's hands perform an action.

In an example, the layout change of the at least one object to be operated is directionally consistent with the change in the distance between the user's hands. For example, when the distance between the user's hands decreases, the layout of the at least one object to be operated scales inward; and when the distance between the user's hands increases, the layout of the at least one object to be operated scales outward.

It is understandable that the user's hands can expand outward or gather inward. When the hands perform an action, the distance between the user's hands will change in real time, and during the process of the change in the distance between the user's hands, the dynamic picture in which the layout of the at least one object to be operated changes correspondingly with the distance between the user's hands will be displayed. Therefore, the user can intuitively see from the dynamic picture that as his hands expand outward, the at least one object to be operated scales outward, and as his hands gather inward, the at least one object to be operated scales inward.

In an optional embodiment, during the action of the user's hands, the state of the first trigger is continuously maintained, such as continuously holding down the target button on the operation handle or maintaining the target gesture.

Step S140: in response to a second trigger for an operation result of the object to be operated, transitionally switching from a current dynamic picture to a corresponding target picture according to a distance change state of the user's hands during a process from the first trigger to the second trigger.

Corresponding to the first trigger, in the present disclosure, the operation result of the object to be operated may be triggered by releasing the target button on the operation handle or canceling the target gesture, thereby obtaining the second trigger for the operation result of the object to be operated. Therefore, in response to the second trigger, the corresponding target picture is first determined according to the distance change state of the user's hands from the first trigger to the second trigger, and then the current dynamic picture is transitionally switched to the target picture. For example, the distance change state may include a direction of change and/or a degree of change in a final distance of the user's hands compared to an initial distance, the final distance is a distance between the user's hands at a moment corresponding to the second trigger, and the initial distance is a distance between the user's hands at a moment corresponding to the first trigger.

Through the above technical solutions, the present disclosure provides a human-computer interaction method for operating an XR system picture using both hands, which enables the layout of at least one object to be operated on the XR system picture to be controlled by the movements of the user's hands, and displays the dynamic picture in which the layout of the at least one object to be operated changes correspondingly to the distance between the user's hands in real time. When the second trigger for the operation result of the object to be operated is received, the current dynamic picture may be switched to the corresponding target picture according to the distance change state of the user's hands during the process from the first trigger to the second trigger. Viewed as a whole, the method achieves the effect of gradually switching from the original first picture to the target picture according to the movements of the user's hands. Compared to the UI button pressing method, the interactive operation is more convenient, has a lower learning cost, does not depend on the UI, and can achieve the real-time triggering.

Exemplarily, when the user's hands expand outward or gather inward, the layout of the objects to be operated in the dynamic picture follows the movements of the user's hands and scales outward or inward accordingly. The user can intuitively see from the dynamic picture that the layout of the at least one object to be operated changes with the movements of his hands, thus providing a prediction of the changes in the final target picture. That is, the user can predict from the dynamic picture that when the operation result of the object to be operated is triggered, the object to be operated may fly out from the edge of the picture to transitionally switch to the target picture, or disappear from the center of the picture to transitionally switch to the target picture.

In an optional embodiment, the human-computer interaction method provided in the present disclosure further includes: determining a first target distance and a second target distance respectively based on an initial distance between the user's hands; and determining that the second trigger for the operation result of the object to be operated is received, in response to the distance between the user's hands being greater than the first target distance or less than the second target distance, when the first trigger disappears. Subsequently, in response to the second trigger, the current dynamic picture is transitionally switch to the corresponding target picture according to the distance change state of the user's hands during the process from the first trigger to the second trigger.

In an exemplary embodiment, the first target distance and the second target distance may be determined respectively with a first percentage and a second percentage based on the initial distance between the user's hands. The first percentage is greater than 1, and the second percentage is less than 1. For example, the first percentage may be set to 1.4, and the second percentage may be set to 0.3.

In an optional embodiment, the human-computer interaction method provided by the present disclosure further includes: reverting from a current dynamic picture back to the first picture, in response to the distance between the user's hands not being greater than the first target distance and not being less than the second target distance, when the first trigger disappears.

During the above-mentioned process, when the first trigger disappears, for example, when releasing the target button on the operation handle or canceling the target gesture, it is necessary to determine whether the distance between the user's hands is greater than the first target distance or less than the second target distance. If the distance between the user's hands is greater than the first target distance, it indicates that the distance after the hands expand outward reaches the trigger condition. If the distance between the user's hands is less than the second target distance, it indicates that the distance after the hands gather inward reaches the trigger condition. Therefore, when any of the above judgment conditions is met, it may be considered that the second trigger for the operation result of the object to be operated is received, and the target picture is transitionally switched. However, when neither of the above two judgment conditions are satisfied, it is necessary to revert from the current dynamic picture back to the original first picture.

Through the above-mentioned technical solution, when the first trigger disappears, a corresponding judgment may be made based on the distance between the user's hands to determine whether to switch to the corresponding target picture or to revert to the original first picture.

In an optional embodiment, the human-computer interaction method provided by the present disclosure further includes: determining a third target distance based on the initial distance between the user's hands; and in the case where the first trigger has not disappeared, determining that the second trigger for the operation result of the object to be operated is received, in response to the distance between the user's hands being greater than the third target distance. Here, the third target distance is greater than the first target distance.

In an exemplary embodiment, the third target distance may be determined with a third percentage based on the initial distance between the user's hands. The third percentage is greater than the first percentage, for example, the third percentage may be set to 2.

It should be noted that in the process of the previous embodiment, the judgment based on the distance between the hands is made when the first trigger disappears, such as when the target button on the operation handle is released or the target gesture is canceled, to determine whether to switch to the corresponding target picture or to revert to the original first picture. However, in the present embodiment, the judgment on the distance between the hands is made in real-time when the first trigger has not disappeared. If it is determined that the distance between the user's hands has already greater than the third target distance, it indicates that the user has a strong intent to switch pictures. Therefore, it may be directly determined that the second trigger for the operation result on the object to be operated has been received.

Figure 2:
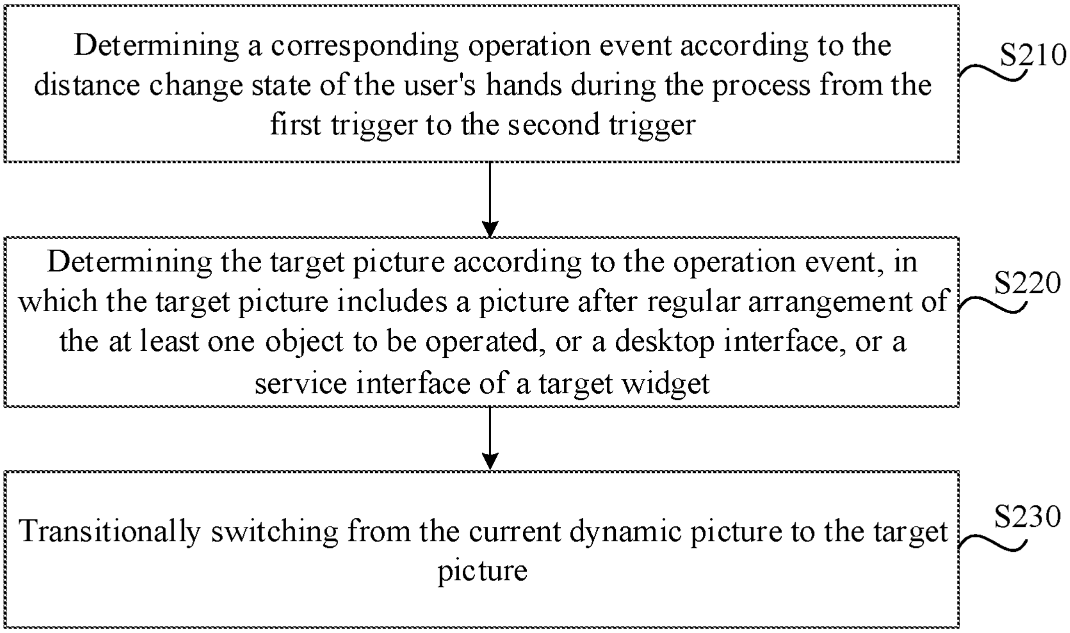
FIG. 2 illustrates another flowchart of a human-computer interaction method for an XR system in an exemplary embodiment.

In an optional embodiment, please refer to FIG. 2, step S140 specifically includes the following steps.

Step S210: determining a corresponding operation event according to the distance change state of the user's hands during the process from the first trigger to the second trigger.

Here, the distance change state may include the direction of change and/or the degree of change in the final distance of the user's hands compared to the initial distance, the final distance is a distance between the user's hands at a moment corresponding to the second trigger, and the initial distance is a distance between the user's hands at a moment corresponding to the first trigger.

In an embodiment, different operation events may be predefined. In response to the second trigger for the operation result of the object to be operated, the corresponding operation event may be determined according to the number and/or type of objects to be operated, as well as the distance change state of the user's hands during the process from the first trigger to the second trigger.

For example, in the case of a plurality of window interfaces, if it is assumed that the direction of change of the user's hands during the process from the first trigger to the second trigger is an outward expansion, and the degree of change of the outward expansion exceeds a fourth percentage of the initial distance, then the corresponding operation event is determined to be the regular arrangement of the plurality of window interfaces. Alternatively, if the degree of change of the outward expansion exceeds a fifth percentage of the initial distance, then the corresponding operation event is determined to be switching to a service interface of a target widget.

For another example, for the service interface of a target widget, if it is assumed that the direction of change of the user's hands during the process from the first trigger to the second trigger is an outward expansion, and the degree of change of the outward expansion exceeds a sixth percentage of the initial distance, then the corresponding operation event is determined to be the switch to the desktop interface.

It may be understood that the above-mentioned examples are only illustrative descriptions of operation events and do not limit the present disclosure. In practice, users can freely define various operation events.

Step S220: determining the target picture according to the operation event, in which the target picture includes a picture after regular arrangement of the at least one object to be operated, or a desktop interface, or a service interface of a target widget.

Step S230: transitionally switching from the current dynamic picture to the target picture.

Figure 3:
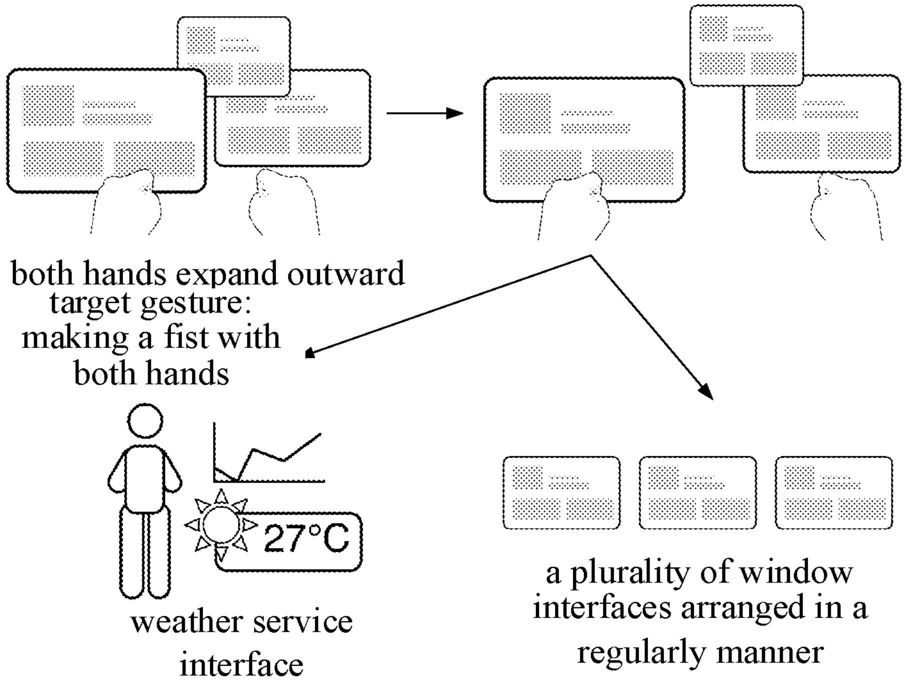
FIG. 3 illustrates a schematic diagram in which the layout of a plurality of window interfaces changes following the distance between the user's hands.

In an exemplary embodiment, it is described by taking the at least one object to be operated as a plurality of window interfaces as an example, and FIG. 3 illustrates a schematic diagram in which the layout of the plurality of window interfaces changes following the distance between the user's hands. Referring to FIG. 3, the original first picture includes a plurality of disorganized window interfaces. As the user's hands expand outward, the layout of these window interfaces scales outward gradually with the increase in the distance between the hands. Upon receiving the second trigger, one possible implementation may switch to a picture where the plurality of window interfaces is arranged in a regularly manner, and in another possible implementation, it may switch to a weather service interface corresponding to a weather widget.

In summary, the human-computer interaction method provided by the present disclosure can use both hands to operate the XR system picture. In complex scenarios with a plurality of windows, the picture may be quickly and easily switched, or the required widget services may be invoked. In addition, a plurality of disorganized stacked windows may be arranged regularly to facilitate users to find the desired window quickly.

Additionally, the interaction method can respond in real time to triggers. Before the target picture is switched, it can be interrupted at any time to abandon the change, allowing the picture to revert to its original state, or to trigger other events in the opposite direction, such as changing the hand movement from outward expanding to inward gathering to trigger the operation events defined for the inward gathering situation.

Figure 4:
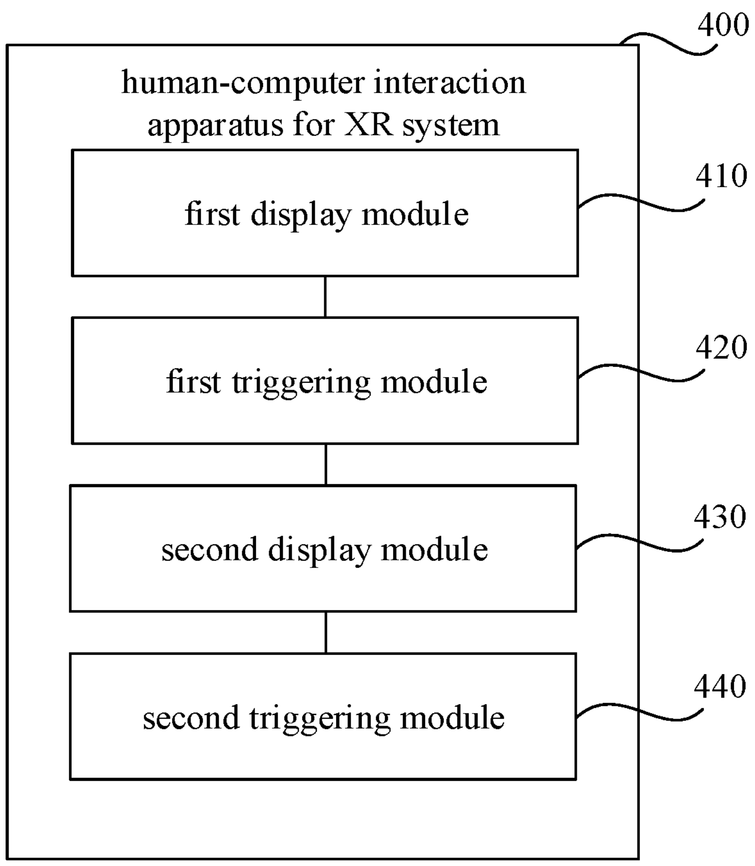
FIG. 4 illustrates a block diagram of a human-computer interaction apparatus for an XR system in an exemplary embodiment.

FIG. 4 illustrates a block diagram of a human-computer interaction apparatus for an XR system in an exemplary embodiment. Referring to FIG. 4, the human-computer interaction apparatus 400 for the XR system includes:

- a first display module 410, which is configured to display a first picture including at least one object to be operated;
- a first triggering module 420, which is configured to acquire a distance between a user's hands in response to a first trigger for operating the object to be operated;
- a second display module 430, which is configured to display a dynamic picture in which a layout of the at least one object to be operated changes correspondingly with the distance between the user's hands, when the user's hands perform an action;

and a second triggering module 440, which is configured to, in response to a second trigger for an operation result of the object to be operated, transitionally switch from a current dynamic picture to a corresponding target picture according to a distance change state of the user's hands during a process from the first trigger to the second trigger.

In an optional embodiment, when the distance between the user's hands decreases, the layout of the at least one object to be operated scales inward; and when the distance between the user's hands increases, the layout of the at least one object to be operated scales outward.

In an optional embodiment, the first triggering module 420 is configured to determine that the first trigger for operating the object to be operated is received, in the case where a target button on an operating handle connected to the XR system is pressed, or in the case where a target gesture made by the user is recognized.

In an optional embodiment, the second triggering module 440 is configured to: determine a first target distance and a second target distance respectively based on an initial distance between the user's hands, in which the initial distance is a distance between the user's hands at a moment corresponding to the first trigger; and determine that the second trigger for the operation result of the object to be operated is received, in response to the distance between the user's hands being greater than the first target distance or less than the second target distance, when the first trigger disappears.

In an optional embodiment, the human-computer interaction apparatus 400 further includes a picture reverting module, which is configured to revert from a current dynamic picture back to the first picture, in response to the distance between the user's hands not being greater than the first target distance and not being less than the second target distance, when the first trigger disappears.

In an optional embodiment, the second triggering module 440 is configured to: determine a third target distance based on the initial distance between the user's hands, in which the third target distance is greater than the first target distance; and in the case where the first trigger has not disappeared, determine that the second trigger for the operation result of the object to be operated is received, in response to the distance between the user's hands being greater than the third target distance In an optional embodiment, the second triggering module 440 is configured to determine the first target distance and the second target distance respectively with a first percentage and a second percentage based on the initial distance between the user's hands, in which the first percentage is greater than 1, and the second percentage is less than 1.

In an optional embodiment, the second triggering module 440 is configured to determine the third target distance with a third percentage based on the initial distance between the user's hands, in which the third percentage is greater than the first percentage.

In an optional embodiment, the second triggering module 440 is configured to: determine a corresponding operation event according to the distance change state of the user's hands during the process from the first trigger to the second trigger; determine the target picture according to the operation event, in which the target picture includes a picture after regular arrangement of the at least one object to be operated, or a desktop interface, or a service interface of a target widget; and transitionally switch from the current dynamic picture to the target picture.

In an optional embodiment, the distance change state includes a direction of change and/or a degree of change in a final distance of the user's hands compared to an initial distance, in which the final distance is a distance between the user's hands at a moment corresponding to the second trigger, and the initial distance is a distance between the user's hands at a moment corresponding to the first trigger.

Regarding the apparatuses in the above-mentioned embodiments, the specific manner in which each module performs operations has been described in detail in the embodiments related to the method, and will not be described in detail here.

Figure 5:
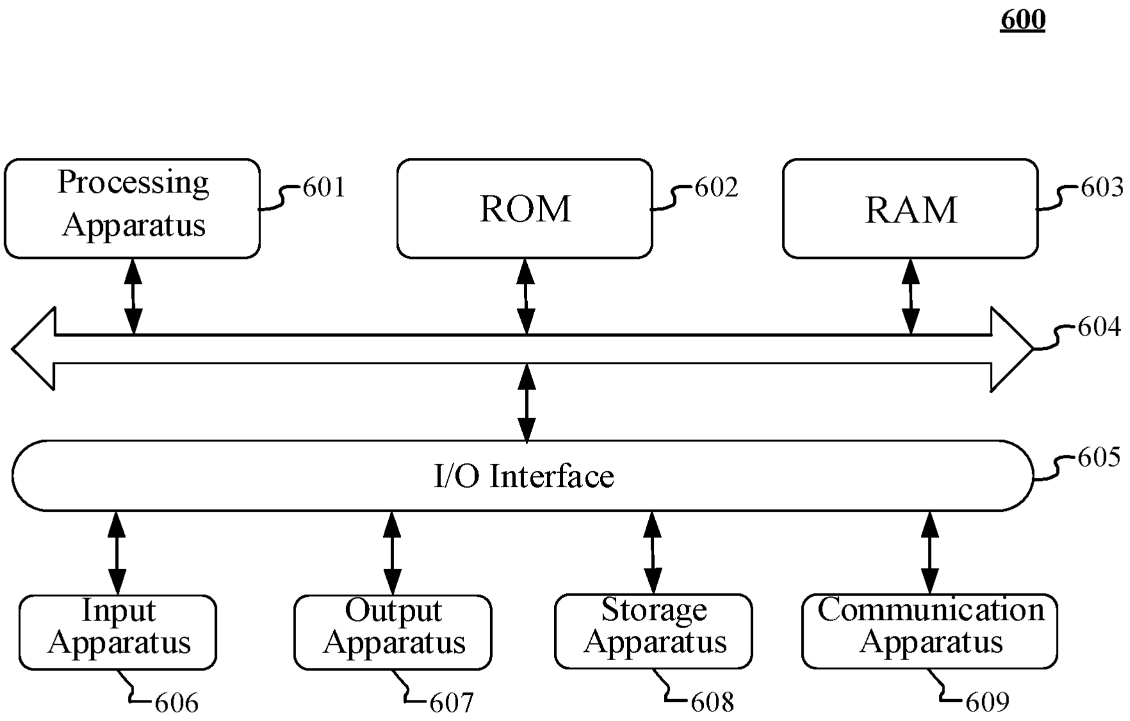
FIG. 5 illustrates a block diagram of an XR system in an exemplary embodiment.

Referring to FIG. 5, which illustrates a schematic structural diagram of an XR system 600 suitable for implementing the embodiments of the present disclosure. The XR system 600 in the embodiments of the present disclosure may include but is not limited to a VR device with a VR function, an AR device with an AR function, or an MR device with an MR function, etc. The XR system shown in FIG. 5 is only an example and should not bring any limitations to the functions and scope of use of the embodiments of the present disclosure.

As illustrated in FIG. 5, the XR system 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the XR system 600. The processing apparatus 601, the ROM 602, and the RAM 603 are interconnected through a bus 604. An input/output (I/O) interface 605 is also connected to the bus 604.

Usually, the following apparatuses may be connected to the I/O interface 605: an input apparatus 606 including, for example, a touch screen, a touch pad, a keyboard, a mouse, a camera, a microphone, an accelerometer, a gyroscope, an operation handle, a capturing apparatus or the like; an output apparatus 607 including, for example, a liquid crystal display (LCD), a loudspeaker, a vibrator, or the like; a storage apparatus 608; and a communication apparatus 609. The communication apparatus 609 may allow the XR system 600 to be in wireless or wired communication with other devices to exchange data. While FIG. 5 illustrates the XR system 600 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned XR system, or may also exist alone without being assembled into the XR system.

The above-mentioned computer-readable medium carries one or more programs, and when the one or more programs are executed by the XR system, the XR system is caused to: display a first picture including at least one object to be operated; acquire a distance between a user's hands in response to a first trigger for operating the object to be operated; display a dynamic picture in which a layout of the at least one object to be operated changes correspondingly with the distance between the user's hands, when the user's hands perform an action; and in response to a second trigger for an operation result of the object to be operated, transitionally switch from a current dynamic picture to a corresponding target picture according to a distance change state of the user's hands during a process from the first trigger to the second trigger.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first display module may also be described as "a module that displays a first picture including at least one object to be operated."

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides a human-computer interaction method for an XR system, and the method includes:

displaying a first picture including at least one object to be operated;

acquiring a distance between a user's hands in response to a first trigger for operating the object to be operated;

displaying a dynamic picture in which a layout of the at least one object to be operated changes correspondingly with the distance between the user's hands, when the user's hands perform an action;

and in response to a second trigger for an operation result of the object to be operated, transitionally switching from a current dynamic picture to a corresponding target picture according to a distance change state of the user's hands during a process from the first trigger to the second trigger.

According to one or more embodiments of the present disclosure, Example 2 provides the method according to Example 1, when the distance between the user's hands decreases, the layout of the at least one object to be operated scales inward; and when the distance between the user's hands increases, the layout of the at least one object to be operated scales outward.

According to one or more embodiments of the present disclosure, Example 3 provides the method according to Example 1, which further includes:

determining that the first trigger for operating the object to be operated is received, in the case where a target button on an operating handle connected to the XR system is pressed, or in the case where a target gesture made by the user is recognized.

According to one or more embodiments of the present disclosure, Example 4 provides the method according to Example 1, which further includes:

determining a first target distance and a second target distance respectively based on an initial distance between the user's hands, in which the initial distance is a distance between the user's hands at a moment corresponding to the first trigger;

and determining that the second trigger for the operation result of the object to be operated is received, in response to the distance between the user's hands being greater than the first target distance or less than the second target distance, when the first trigger disappears.

According to one or more embodiments of the present disclosure, Example 5 provides the method according to Example 4, which further includes:

reverting from a current dynamic picture back to the first picture, in response to the distance between the user's hands not being greater than the first target distance and not being less than the second target distance, when the first trigger disappears.

According to one or more embodiments of the present disclosure, Example 6 provides the method according to Example 4, which further includes:

determining a third target distance based on the initial distance between the user's hands, in which the third target distance is greater than the first target distance;

and determining that the second trigger for the operation result of the object to be operated is received, in response to the distance between the user's hands being greater than the third target distance, when the first trigger has not disappeared.

According to one or more embodiments of the present disclosure, Example 7 provides the method according to Example 6, the determining the first target distance and the second target distance respectively based on the initial distance between the user's hands includes:

determining the first target distance and the second target distance respectively with a first percentage and a second percentage based on the initial distance between the user's hands, in which the first percentage is greater than 1, and the second percentage is less than 1.

According to one or more embodiments of the present disclosure, Example 8 provides the method according to Example 7, the determining the third target distance based on the initial distance between the user's hands includes:

determining the third target distance with a third percentage based on the initial distance between the user's hands, in which the third percentage is greater than the first percentage.

According to one or more embodiments of the present disclosure, Example 9 provides the method according to any one of Examples 1-8, the transitionally switching from the current dynamic picture to the corresponding target picture according to the distance change state of the user's hands during the process from the first trigger to the second trigger, includes:

determining a corresponding operation event according to the distance change state of the user's hands during the process from the first trigger to the second trigger;

determining the target picture according to the operation event, in which the target picture comprises a picture after regular arrangement of the at least one object to be operated, or a desktop interface, or a service interface of a target widget;

and transitionally switching from the current dynamic picture to the target picture.

According to one or more embodiments of the present disclosure, Example 10 provides the method according to Example 9, the distance change state includes a direction of change and/or a degree of change in a final distance of the user's hands compared to an initial distance, the final distance is a distance between the user's hands at a moment corresponding to the second trigger, and the initial distance is a distance between the user's hands at a moment corresponding to the first trigger.

According to one or more embodiments of the present disclosure, Example 11 provides a human-computer interaction apparatus for an XR system, and the apparatus includes:

a first display module, which is configured to display a first picture comprising at least one object to be operated;

a first triggering module, which is configured to acquire a distance between a user's hands in response to a first trigger for operating the object to be operated;

a second display module, which is configured to display a dynamic picture in which a layout of the at least one object to be operated changes correspondingly with the distance between the user's hands, when the user's hands perform an action;

and a second triggering module, which is configured to, in response to a second trigger for an operation result of the object to be operated, transitionally switch from a current dynamic picture to a corresponding target picture according to a distance change state of the user's hands during a process from the first trigger to the second trigger.

According to one or more embodiments of the present disclosure, Example 12 provides a computer-readable storage medium on which a computer program is stored, and the computer program, when executed by a processing apparatus, implements the method according to any one of Examples 1-10.

According to one or more embodiments of the present disclosure, Example 13 provides an XR system, including:

a storage apparatus on which a computer program is stored;

and a processing apparatus, which is configured to execute the computer program stored in the storage apparatus, to implement the method according to any one of Examples 1-10.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A human-computer interaction method for an XR system, comprising:

displaying a first picture, a display of a human-computer interaction apparatus, comprising at least one object to be operated;

acquiring a distance between a user's hands in response to a first trigger for operating the object to be operated;

displaying a dynamic picture in which a layout of the at least one object to be operated changes correspondingly with the distance between the user's hands, when the user's hands perform an action; and in response to a second trigger for an operation result of the object to be operated, transitionally switching from a current dynamic picture to a corresponding target picture according to a distance change state of the user's hands during a process from the first trigger to the second trigger;

determining a first target distance and a second target distance respectively based on an initial distance between the user's hands, wherein the initial distance is a distance between the user's hands at a moment corresponding to the first trigger; and determining that the second trigger for the operation result of the object to be operated is received, in response to the distance between the user's hands being greater than the first target distance or less than the second target distance, when the first trigger is removed;

determining a third target distance based on the initial distance between the user's hands, wherein the third target distance is greater than the first target distance: and determining that the second trigger for the operation result of the object to be operated is received, in response to the distance between the user's hands being greater than the third target distance, when the first trigger is not removed.

2. The method according to claim 1, wherein when the distance between the user's hands decreases, the layout of the at least one object to be operated scales inward; and when the distance between the user's hands increases, the layout of the at least one object to be operated scales outward.

3. The method according to claim 1, further comprising:

determining that the first trigger for operating the object to be operated is received, in a case where a target button on an operating handle connected to the XR system is pressed, or in a case where a target gesture made by the user is recognized.

4. The method according to claim 1, further comprising:

reverting from a current dynamic picture back to the first picture, in response to the distance between the user's hands not being greater than the first target distance and not being less than the second target distance, when the first trigger is removed.

5. The method according to claim 1, wherein the determining the first target distance and the second target distance respectively based on the initial distance between the user's hands, comprises:

determining the first target distance and the second target distance respectively with a first percentage and a second percentage based on the initial distance between the user's hands, wherein the first percentage is greater than 1, and the second percentage is less than 1.

6. The method according to claim 5, wherein the determining the third target distance based on the initial distance between the user's hands, comprises:

determining the third target distance with a third percentage based on the initial distance between the user's hands, wherein the third percentage is greater than the first percentage.

7. The method according to claim 1, wherein the transitionally switching from the current dynamic picture to the corresponding target picture according to the distance change state of the user's hands during the process from the first trigger to the second trigger, comprises:

determining a corresponding operation event according to the distance change state of the user's hands during the process from the first trigger to the second trigger;

determining the target picture according to the operation event, wherein the target picture comprises a picture after regular arrangement of the at least one object to be operated, or a desktop interface, or a service interface of a target widget; and transitionally switching from the current dynamic picture to the target picture.

8. The method according to claim 7, wherein the distance change state comprises a direction of change and/or a degree of change in a final distance of the user's hands compared to an initial distance, the final distance is a distance between the user's hands at a moment corresponding to the second trigger, and the initial distance is a distance between the user's hands at a moment corresponding to the first trigger.

9. A non-transitory computer-readable storage medium on which a computer program is stored, wherein the computer program, when executed by a processing apparatus, implements a human-computer interaction method for an XR system, comprising:

displaying, on a display of a human-computer interaction apparatus, a first picture comprising at least one object to be operated;

acquiring a distance between a user's hands in response to a first trigger for operating the object to be operated;

displaying a dynamic picture in which a layout of the at least one object to be operated changes correspondingly with the distance between the user's hands, when the user's hands perform an action; and in response to a second trigger for an operation result of the object to be operated, transitionally switching from a current dynamic picture to a corresponding target picture according to a distance change state of the user's hands during a process from the first trigger to the second trigger;

determining a first target distance and a second target distance respectively based on an initial distance between the user's hands, wherein the initial distance is a distance between the user's hands at a moment corresponding to the first trigger; and determining that the second trigger for the operation result of the object to be operated is received, in response to the distance between the user's hands being greater than the first target distance or less than the second target distance, when the first trigger is removed;

determining a third target distance based on the initial distance between the user's hands, wherein the third target distance is greater than the first target distance; and determining that the second trigger for the operation result of the object to be operated is received, in response to the distance between the user's hands being greater than the third target distance, when the first trigger is not removed.

10. An XR system, comprising:

a storage apparatus on which a computer program is stored; and a processing apparatus comprising a central processing unit, configured to execute the computer program stored in the storage apparatus, to implement a human-computer interaction method for the XR system, comprising:

displaying, on a display of a human-computer interaction apparatus, a first picture comprising at least one object to be operated; acquiring a distance between a user's hands in response to a first trigger for operating the object to be operated;

displaying a dynamic picture in which a layout of the at least one object to be operated changes correspondingly with the distance between the user's hands, when the user's hands perform an action; and in response to a second trigger for an operation result of the object to be operated, transitionally switching from a current dynamic picture to a corresponding target picture according to a distance change state of the user's hands during a process from the first trigger to the second trigger;

determining a first target distance and a second target distance respectively based on an initial distance between the user's hands, wherein the initial distance is a distance between the user's hands at a moment corresponding to the first trigger; and determining that the second trigger for the operation result of the object to be operated is received, in response to the distance between the user's hands being greater than the first target distance or less than the second target distance, when the first trigger is removed;

determining a third target distance based on the initial distance between the user's hands, wherein the third target distance is greater than the first target distance; and determining that the second trigger for the operation result of the object to be operated is received, in response to the distance between the user's hands being greater than the third target distance, when the first trigger is not removed.

11. The system according to claim 10, wherein when the distance between the user's hands decreases, the layout of the at least one object to be operated scales inward; and when the distance between the user's hands increases, the layout of the at least one object to be operated scales outward.

12. The system according to claim 10, wherein the method further comprises:

determining that the first trigger for operating the object to be operated is received, in a case where a target button on an operating handle connected to the XR system is pressed, or in a case where a target gesture made by the user is recognized.

13. The system according to claim 10, wherein the method further comprises:

reverting from a current dynamic picture back to the first picture, in response to the distance between the user's hands not being greater than the first target distance and not being less than the second target distance, when the first trigger is removed.

14. The system according to claim 10, wherein the determining the first target distance and the second target distance respectively based on the initial distance between the user's hands, comprises:

determining the first target distance and the second target distance respectively with a first percentage and a second percentage based on the initial distance between the user's hands, wherein the first percentage is greater than 1, and the second percentage is less than 1.

15. The system according to claim 14, wherein the determining the third target distance based on the initial distance between the user's hands, comprises:

determining the third target distance with a third percentage based on the initial distance between the user's hands, wherein the third percentage is greater than the first percentage.

16. The system according to claim 10, wherein the transitionally switching from the current dynamic picture to the corresponding target picture according to the distance change state of the user's hands during the process from the first trigger to the second trigger, comprises:

determining a corresponding operation event according to the distance change state of the user's hands during the process from the first trigger to the second trigger;

determining the target picture according to the operation event, wherein the target picture comprises a picture after regular arrangement of the at least one object to be operated, or a desktop interface, or a service interface of a target widget; and transitionally switching from the current dynamic picture to the target picture.

* * * * *